Figure 1:
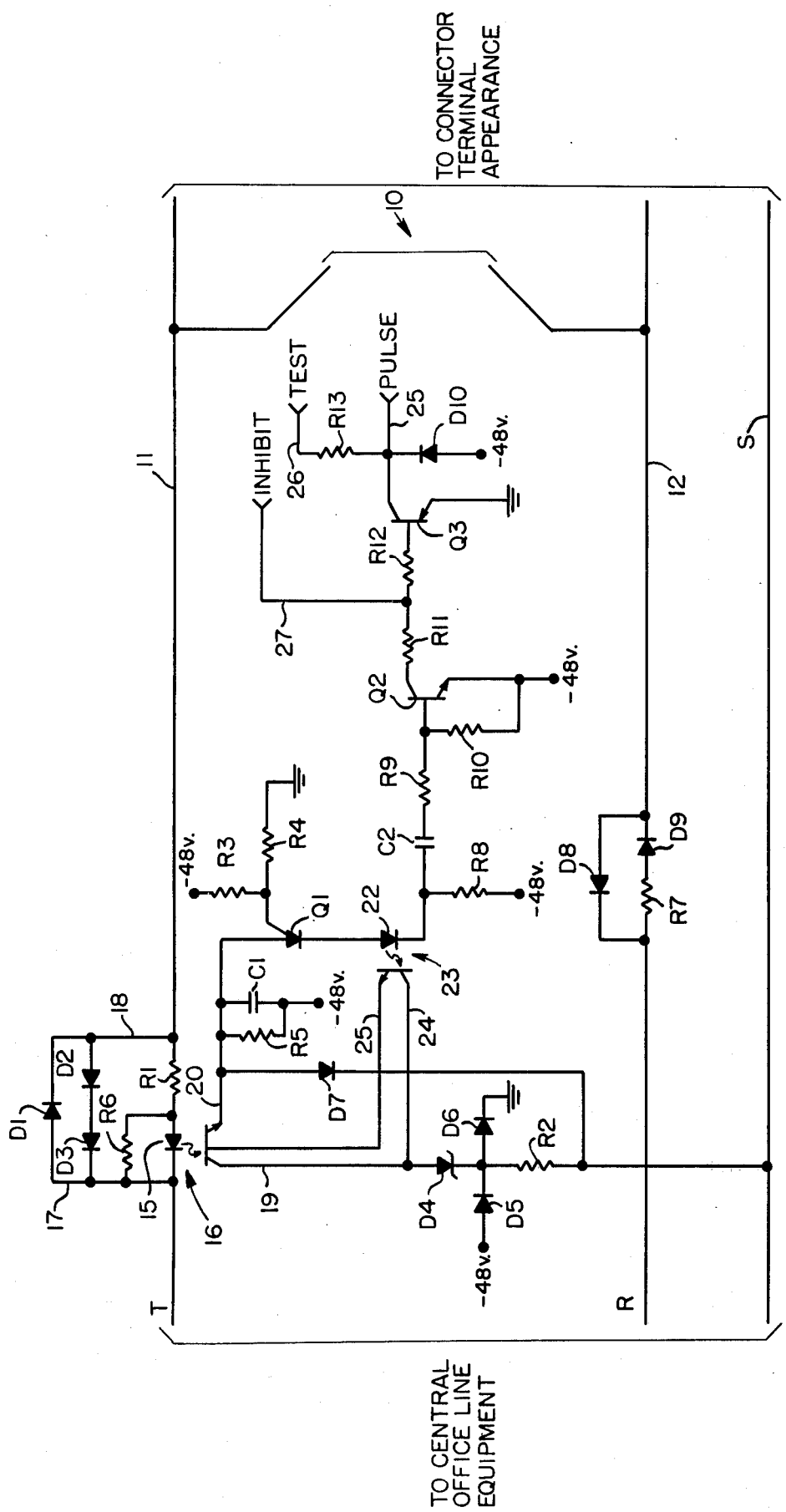

United States Patent [19]

Heffernan et al.

[11] 4,063,037

[45] Dec. 13, 1977

[54] TELEPHONE METERING INTERFACE WITH REVERSE SIGNAL SENSOR

[75] Inventors: Stuart D. Heffernan, Fairport; Donald G. Maring, Rochester, both of N.Y.

[73] Assignee: Rochester Telephone Corporation, Rochester, N.Y.

[21] Appl. No.: 696,061

[22] Filed: June 14, 1976

[51] Int. Cl.² .................................... H04M 15/28
[52] U.S. Cl. .............................. 179/7.1 R; 179/8 A
[58] Field of Search ............... 179/6.3 R, 6.4, 6.31, 179/6.5, 7 R, 7.1 R, 7 NM, 7.1 TD, 8 A, 8 R, 90 R, 90 B, 84 L, 81 C

[56] References Cited

U.S. PATENT DOCUMENTS

| | | | |
|---|---|---|---|
| 3,579,253 | 5/1971 | Edington | 179/6.3 R |
| 3,652,796 | 3/1972 | Kezuka | 179/7.1 R |
| 3,936,608 | 2/1976 | Danielson | 179/7 R |
| 3,988,549 | 10/1976 | Merlin et al. | 179/90 R |

Primary Examiner—Kathleen H. Claffy
Assistant Examiner—Gerald L. Brigance
Attorney, Agent, or Firm—Shlesinger, Fitzsimmons & Shlesinger

[57] ABSTRACT

A sensing circuit is placed in the tip line of a subscriber's loop to sense, selectively, the placement of an outgoing, local call. The circuit includes a first LED for energizing a metering circuit upon detection of a billable call, and a second LED for latching the metering circuit in its energized condition within a predetermined interval after the billable call is detected. The metering circuit is automatically deenergized when the called party goes on-hook. A balancing circuit is included in the ring line of the equipment to balance the impedance created in the tip line by the sensing circuit; and the metering circuit can be designed selectively to produce a one-shot metering pulse for each billable call, or to produce a continuous signal for the duration of the call.

14 Claims, 2 Drawing Figures

TELEPHONE METERING INTERFACE WITH REVERSE SIGNAL SENSOR

This invention relates to telephone metering or billing systems, and more particularly to improved apparatus for controlling local call billing meters for telephones and the like.

It has been customary heretofore to control telephone call billing meters through the use of electromechanical mechanisms which, although suitable for the purpose designed, nevertheless are rather expensive to manufacture and difficult to install and maintain. Moreover, in recent years to offset rapidly increasing costs telephone companies have found it necessary to monitor more carefully the actual usage or off-hook times of individual subscriber telephones, so that revenues can be made to reflect more accurately the actual rather than potential usage of telephone lines. This creates a need for more efficient and effective apparatus for metering the actual time that a telephone is in use.

It is an object of this invention, therefore, to provide improved apparatus for monitoring the use of telephones, and more particularly telephone usage on a local call basis, as distinguished from long distance usage.

Another object of this invention is to provide improved telephone message metering apparatus which is substantially more compact and reliable than prior such apparatus.

Still another object of this invention is to provide improved interface apparatus for automatically sensing a completed local call, and for immediately signalling an associated message meter to record the call.

A more specific object of this invention is to provide improved interface apparatus of the type described which produces either a momentary or a steady signal for operating associated billing apparatus when a telephone is used to place a call.

Other objects of the invention will be apparent hereinafter from the specification and from the recital of the appended claims, particularly when read in conjunction with the accompanying drawings.

Figure 2:
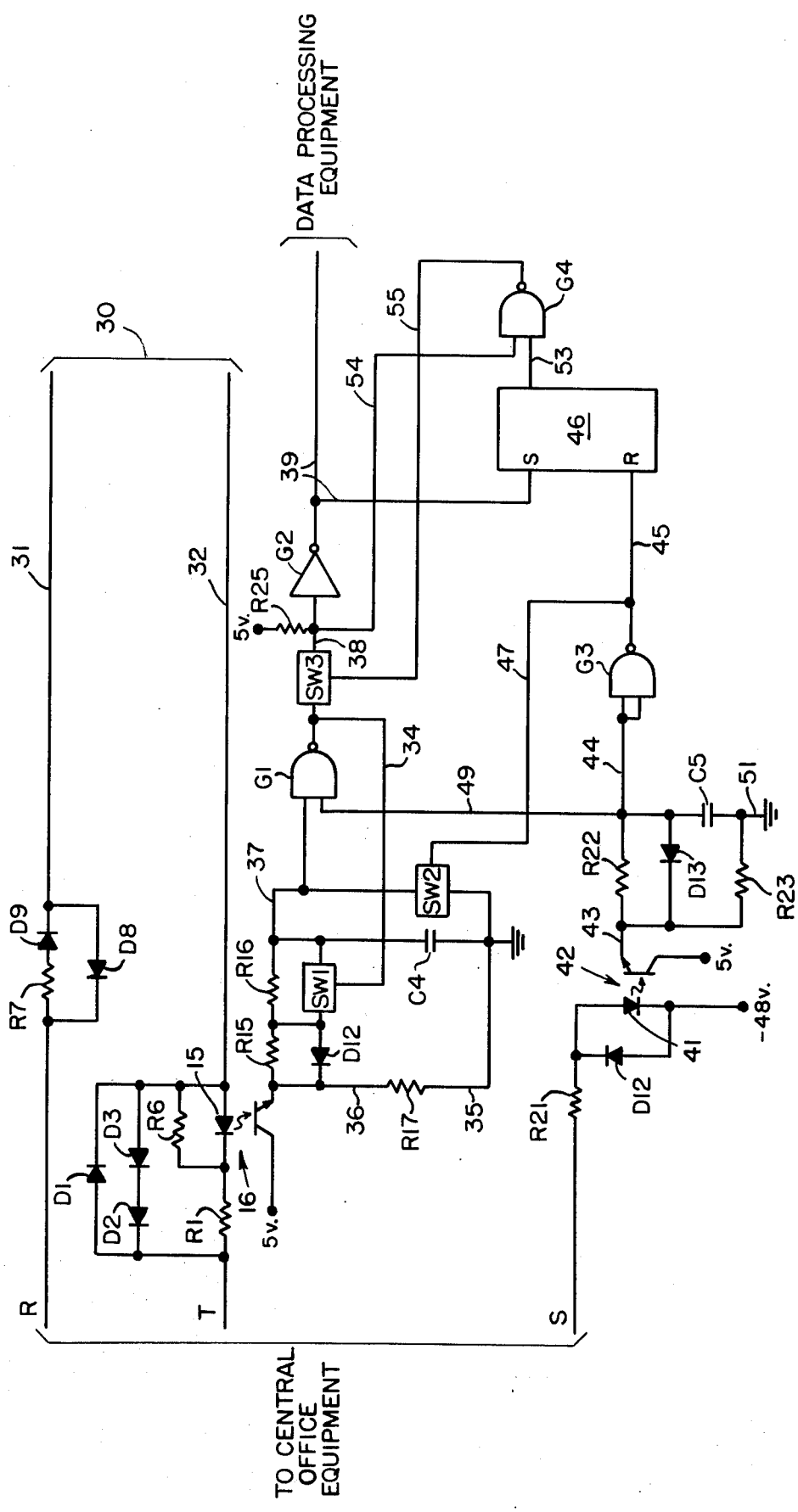

In the drawings:

FIG. 1 is a wiring diagram illustrating schematically telephone interface apparatus made according to one embodiment of this invention for detecting the successful placement of a telephone call, and for producing in response to such call a signal which triggers associated metering apparatus; and FIG. 2 is a wiring diagram illustrating schematically a modified form of this interface apparatus.

Referring now to the drawings by numerals of reference, and first to the embodiment illustrated in FIG. 1, 10 denotes generally a conventional telephone or subscriber's loop having a tip line 11 and a ring line 12, which are connected as noted hereinafter to the tip T and ring R lines, respectively, of the central office equipment which services the telephone. The usual sleeve line is denoted at S.

When the telephone 10 is in its idle or on-hook position, the central office equipment, by apparatus which forms no part of this invention, applies −48 v. to the sleeve lead S, ground potential to the T line, and −48 v. to the R line. When the telephone is in use the central office equipment applies ground potential to the lead S until the call has been completed.

The telephone 10 can be used to place either an outgoing long distance call, a "no charge" call, or a local call. If the outgoing call is of the toll or "no charge" variety, the hereinafter described sensing equipment is not affected, but if it is a local call the central office equipment causes the potential on the line T to be held between ground and −24 v., and the potential on line R to be held between −48 v. and −24 v. until the called party answers. As soon as the called party answers the potential on line T is shifted to between −48 v. and −24 v., and the potential on line R shifts to between ground and −24 v. The effect of this voltage shift, when an outgoing local call has been answered, is to reverse the current flow in the calling party's loop 10. This reversal in the potential on the lines T and R, and the consequent reversal of the current flow in the calling party's loop, is detected by the hereinafter described apparatus, and is utilized for metering or billing purposes.

As shown in FIG. 1, the portion of the subscriber's loop denoted at 11 is connected by a resistor R1 and a light emitting diode (LED) 15 to the tip line T. Diode 15 forms part of an optical isolator 16 which detects reversal of current flow in the telephone loop as noted hereinafter. A diode D1, which is connected in parallel with the LED 15 and resistor R1, has its anode connected by a line 17 to the tip line T, and its cathode connected by a line 18 to line 11. Two additional diodes D2 and D3 are connected in series with each other and in parallel with the diode D1 between lines 17 and 18 to allow current flow between these lines in a direction opposite to that of D1. A resistor R6 is connected in parallel with the LED 15 between the resistor R1 and the line 17. The resistor R1, which is of relatively low ohmic value (e.g., 1.8 ohms.), and the two diodes D2 and D3 function to limit the current flow through the LED 15, thus forming a protection network for this diode. The resistor R6, on the other hand, is of substantially higher ohmic value (for example 100 ohms), and is selected to adjust the threshold current at which the diode 15 will illuminate to trigger the isolator 16.

To balance the portion of the sensing circuit connected in the tip line, a resistor R7 is connected at one end to the ring line R and at its opposite end to the anode of a diode D9, the cathode of which is connected to line 12. A diode D8 is connected in parallel with the resistor R7 and the diode D9 to allow current flow in a direction opposite to that of diode D9. The resistor R7 has an ohmic value approximately equal to that of the resistor R1, and together with diodes D8 and D9 balance the impedance which is introduced in the tip line by the elements 15, R1 and D1.

With the circuit as thus far described, when an outgoing local call is placed, the diodes D1 and D8 are biased forwardly so that current flows in the subscriber's loop from the tip line T, through diode D1, line 11, the phone 10, line 12, diode D8 and the ring line R to the central office equipment. However, as soon as the called party goes off-hook, the polarity of the tip and ring lines is reversed, so that the diodes D9 and 15 now become biased in a forward direction so that current flows in the reverse direction in the loop from the ring line R through the resistor R7, the diode D9, line 12, the phone 10, line 11, resistor R1, and in parallel through the diode 15 and the resistor R6 to the tip line T. A portion of this current flows also through the diodes D2 and D3 to limit the current flow through the diode 15 as noted above.

This reverse current flow illuminates the LED 15, which therefore triggers the photo transistor stage of the isolator 16. This transistor has a collector connected by a line 19 through a Zener diode D4 and resistor R2 to the sleeve line S, and an emitter connected by a line 20 through a resistor R5 and a capacitor C1, which are connected in parallel, to a negative −48 v. power supply provided by the central office equipment. At this time the phone 10 is in use, so that sleeve S is at ground potential. Current therefore flows from line S through the resistor R2, the diode D4, line 19, the collector-emitter circuit of the photo transitor stage of the isolator 16, line 20 and the resistor R5 and capacitor C1 to the −48 v. power supply so that the capacitor C1 begins to charge. After a nominal delay of 500ms, for example, the potential on C1, which is also connected on line 20 to the anode of a programmable uni-junction transitor Q1, becomes sufficient to cause this latter transistor to fire and deliver current through the LED 22 of a second optical isolator 23 to one side of a second capacitor C2, and through a resistor R8 to the −48 v. power source.

The photo transitor stage of the isolator 23 has its collector connected by line 24 to line 19, and its emitter connected by line 25 to the base of the photo transitor in the isolator 16, so that as soon as the diode 22 conducts and illuminates, it triggers the photo transitor stage of isolator 23 so that current begins to flow in its collector-emitter circuit. This current flow operates to maintain a forward bias on the photo transitor stage of the isolator 16, so that its collector-emitter circuit will continue to conduct regardless of any change in polarity of the tip and ring lines. In other words, once the collector-emitter circuit of the transitor in the isolator unit 23 begins to conduct, the illumination from the diode 15 is no longer required to maintain this current flow, and the isolator 16 remains in its conductive mode as long as the sleeve S remains at ground potential. This transfer of control from the tip and ring lines to the optical isolators is required to prevent false output indication as the result of unintentional or memementary reversals of the potentials on the lines T and R subsequent to the initial reversal which occurs when the called party answers or goes off-hook. These momentary, unintentional reversals can occur, for example, as the result of the called party accidentally interrupting the caller by going "on-hook" for a brief interval.

When current flows through the resistor R8, it provides thereacross a voltage drop which remains for the duration of the call initiated by the phone 10. This drop is differentiated through the capacitor C2, and a resistor R9 in series therewith, and is applied to the base of a transistor Q2, which is momentarily triggered for an interval of time depending upon the values of C2 and R9. The collector of Q2 is connected through a resistor R11 and a series connected resistor R12 to the base of a further transistor Q3, which is momentarily triggered when Q2 conducts. Transistor Q3 has a grounded emitter, and a collector connected to an output line 25, which produces a pulse each time Q3 conducts. This pulse on line 25 is utilized to operate a message register (not illustrated) of conventional design which is employed to indicate that a local, outgoing call has been placed by telephone 10.

When the outgoing local call has been completed and the called party has gone "on-hook", the central office equipment removes the ground potential on line S and replaces it with a −48 v. potential, which causes a diode D7, that is connected between line 20 and the sleeve S, to be biased forwardly so that the charge on the capacitor C1 can discharge through D7 to the sleeve line S. This causes transistor Q1 and LED 22 to stop conducting, thereby interrupting the current flow in the collector-emitter circuit 24, 25 of the photo transistor stage of the isolator 23. Since at this time the LED 15 of the isolator 16 is no longer illuminated, the flow of current in the collector-emitter circuit 19, 20 of the transistor stage of the isolator 16 also ceases. Within approximately 20 ms., therefore, the circuit is ready to detect another outgoing local call from the telephone 10.

From the foregoing it will be apparent that the above described sensing circuit provides relatively simple, inexpensive and extremely reliable means for detecting outgoing local telephone calls, and for instantly triggering or operating an associated message meter to count or otherwise record the number of such calls that are made. Once the reversal of the polarity between the ring R and tip T line is detected by the LED 15, the isolator devices 16 and 23 take over to provide a single pulse for application to the associated message meter, and also operate to isolate the pulse generating portion of the circuit from the sensing diode 15, so that subsequent accidental voltage changes on the tip and ring lines will not accidentally reset the sensing device. Instead, the isolators 16 and 23 remain energized until the sleeve line S is returned to its −48 v. potential by the central office equipment at the termination of a call.

Between the resistor R2 and the cathode of the Zener diode D4 the circuit is connected through a diode D6 to ground, and through a further diode D5 to a −48 v. potential in order to protect the circuit from transient voltages that may occur on the sleeve line S. Also, a whisker terminal on the transistor Q1 is connected through a resistor R3 to a −48 v. supply, and through a resistor R4 to ground to maintain the desired bias on this transister. Likewise the emitter of the transistor Q2 is connected to a −48 v. supply and through a resistor R10 to a point between the resistor R9 and the base of the transistor Q2 to maintain the desired bias level of the transistor. Likewise the collector of transistor Q3 is connected through a diode D10 to a −48 v. supply for biasing purposes.

The collector of transistor Q3 is also connected through a resistor R13 to a test line 26, which, when grounded, should operate the associated message register (not illustrated). Moreover, an inhibit line 27 is connected between the resistors R11 and R12, and when grounded, will prevent a pulse output on line 25.

The resistor R2 and the capacitor C1 function as an RC network to provide a slight timing delay circuit which prevents false charging of the capacitor, which might otherwise result from undesirable line transients.

Referring now to the embodiment illustrated in FIG. 2, wherein like numerals are employed to denote elements similar to those employed in the first embodimemt, 30 denotes a telephone having lines 31 and 32 connected to the ring R and tip T lines, respectively, of a telephone system by a modified form of sensing circuitry. In this embodiment the customer's equipment interfaces with the central office equipment in a slightly different way. For example, both the line equipment and connector terminal (not illustrated) are on one side of the interface and the subscriber's loop is on the other. In this configuration, therefore, loop current passes through the interface on both originating (outgoing) and terminating (incoming) calls.

In this embodiemnt the collector of the photo transitor stage of the isolator 16 is connected to a low voltage power supply, such as for example 5 volts, and the emitter thereof is connected through a resistor R15, a solid state switch SW1, when the latter is in its "ON" state, and a capacitor C4 to a line 35, which is connected, in the embodiment illustrated, to ground potential. The emitter is also connected by a line 36 and a resistor R17 to line 35; and a resistor R16 is connected across the swich SW1 so that the emitter is connected also to line 35 through a circuit comprising resistor R 15 in series with the resistor R16 and the capacitor C4. The emitter in isolator 16 is also connected to the ground line 35 through another circuit comprising, in series, the resistor R15, the resistor R16, a line 37, and a second solid state switch SW2, when the latter is in its "ON" state. Line 37 is also connected to one input of a gate G1, the output of which is applied by a line 34 to the switching terminal of switch SW1 normally to hold this switch in its "ON" state. The output of gate G1 is also applied normally through another solid state switch SW3 and a line 38 to the input of gate G2, the output of which is adapted to be applied by a line 39, as noted hereinafter, to data processing equipment of a type which forms no part of this invention.

Also in this embodiment the sleeve line S is connected through a resistor R21 and the LED 41 of an optical isolator 42 to a −48 volt power supply. A diode D12 is connected and parallel and in opposition to the diode 41, with its cathode connected between R21 and the anode of diode 41, and with its anode connected between the cathode of diode 41 and the −48 volt power supply. The transistor stage of isolator 42 has its collector connected to a 5 v. power supply, and its emitter connected by a line 43 and resistor R22 and a line 44 to both inputs of a gate G3. The output of this gate is applied by a line 45 to the reset terminal of a latch 46, and by a line 47 to the switching terminal of the switch SW2. Line 44 is also connected by a line 49 to a second input to gate G1, and to one side of a capacitor C5, the opposite side of which is connected by a line 51 to ground. Line 51 is also connected through a resistor R23 to line 43; and a diode D13 has its cathode connected between resistors R22 and R23, and its anode connected to line 49, so that it is connected in parallel with resistor R22.

Line 39, which handles the output of gate G2, is also connected to the set terminal of the latch 46. The output of this latch is applied by line 53 to one input of a gate G4, the other input of which is connected by a line 54 to line 38 and to one end of a resistor R25, the opposite end of which is connected to a 5v. power supply. The output of gate G4 is applied by a line 55 to the switch terminal of the switch SW3.

When the telephone associated with this circuit is idle, all circuit functions are inhibited by either a −48 volt battery or open circuit condition applied by the central office equipment to the sleeve line S. In this situation the diode 41 is not conducting and is therefore dark, and the associated phototransistor in the isolator 42 is in its non-conducting mode. The ground potential on line 51 is therefore applied via resistors R23 and R22 and line 44 to the inputs of gate G3 so that the output of this gate is high or at a "1" state. At this time, therefore, line 45 applies a constant reset signal to the reset terminal of the latch 46 so that there is a low or "0" output signal from this latch on line 53. This inhibits gate G4 so that the high signal on line 55 holds switch SW3 "ON". The signal from gate G3 is also applied at this time by line 47 to the switch terminal of switch switch SW2 so that this switch is also held in its "ON" condition whereby the capacitor C4 discharges through this switch to the grounded line 35. The circuit will not react to any conditions on the tip and ring line R and T until the sleeve S is grounded.

When in this second embodiment a call terminates on the subscriber's equipment, the ringing current is applied toward the subscriber's loop through the interface. The ringing current may be any frequency between 16 2/3 and 66 2/3 HZ, and may be superimposed on either positive or negative trip battery. During each positive half cycle of ringing (positive on the ring R and ground on the tip T), the diode D9 and the LED 15 will conduct, so that the latter will illuminate and turn on the isolator 16. At this time the sleeve line S is held at ground potential by the central office equipment, so that current flows through resistor R21 and the LED 41 to the −48 v. potential, thereby triggering the transistor stage of isolator 42, so that current flows through the resistor R22 and charges the capacitor C5 to a point where it causes gate G3 to be swung to a blocking mode at which point its output drops to a low or "0" mode. Line 47 thereby switches the switch SW2 to it "OFF" mode, and line 45 removes the signal from the reset terminal of latch 46.

With switch SW2 now OFF, as soon as the diode D15 becomes illuminated the transitor stage of the isolator 16 conducts so that the current flows through resistor R15 and switch SW1 to charge the capacitor C4. During each negative half cycle of the ringing signal (negative on the ring R, and ground on the tip T) the diodes D1 and D8 conduct, the LED 15 ceases to glow, and the phototransitor stage of the isolator 16 will not conduct. However, during this interval the capacitor C4 begins to discharge through switch SW1, the diode D12, which is connected between switch SW1 and line 36, and through resistor R17 to ground. The ratio of the resistances of R15 and R17 is arranged so that capacitor C4 will never change sufficiently to reach a valid "1" state from an alternating current of greater than 1HZ, consequently the ringing current for any terminating calls, or any 60 HZ induction current, will not allow the capacitor C4 to charge sufficiently to apply a "1" input through line 37 to the gate G1. The circuit, therefore, does not react to a terminating or incoming call.

When the subscriber's line originates a toll call or a "No Charge" call, which is not to be billed through the associated billing equipment, the central office equipment is arranged not to give reverse battery supervision when the called party answers the phone. The circuit, therefore, will not recognize an answer condition, and therefore will not bill or meter the call.

When, however, the subscriber originates a local call, the following sequence of events takes place. First, as the subscriber goes off-hook, the sleeve S is grounded by the central office equipment, and consequently the LED 41 illuminates and, as noted above, causes the transistor stage of the isolator 42 to conduct and charge capacitor C5. Any loss of ground potential on the sleeve S will cause the capacitor C5 to begin to discharge through diode D13 and resistor R23 to ground. The resistors R22 and R23, diode D13 and capacitor C5 form a sleeve validation circuit which prevents noise on the sleeve S from disrupting circuit operation.

After a nominal 560 milliseconds of continuously grounded sleeve S, the inputs of G3 and one input of G1 go high or attain a "1" state. The output of G3 therefore goes low and turns off switch SW2, which removes the inhibit from gate G1, and also, as noted above, removes the reset signal from the latch 46.

Also at this time current begins to flow in the tip and ring loop from ground on the line T through D1, the loop and D8 to the −48 volt supply provided by the central office. Consequently, the LED 15 is the isolator 16 remains dark or nonconductive, and the circuit does not react, therefore, to the forward loop current. During dialing, the forward loop is interrupted by the dial pulse contacts in the subscriber's telephone. These interruptions may cause momentarily reverse current transient conditions. Transients, are not, however, recognized by the circuit because of the loop validations circuitry represented by the above-noted combination of resistors R15, R16, D12, switch SW1 and the capacitor C4.

If the called line is busy or there is no answer, there will be no reverse battery answer supervision, and this circuit will not register the call.

If the called party answers, reverse battery supervision is forwarded toward the subscriber's loop. Reversed battery causes current to flow from ground on the ring line R through the resistor R7, diode D9, the LED 15 and resistor R1 to the −48 volt supply then being applied to the tip line T by the central office equipment. The LED 15 is now illuminated and triggers the transistor stage of the isolator 16 so that the capacitor C4 begins to charge up through R15 and switch 1. After a nominal one second delay the signal applied by line 37 to the input of gate G1 attains a high or "1" state, and since at this time the other input to this gate is high, the output of G1 goes low. This removes the signal from line 34, which therefore changes the switch SW1 to its "OFF" mode, and also removes the signal from line 38 at the input of G2, so that the output of this gate goes high, thus applying to line 39 a signal which triggers the associated data processing equipment which begins to record the operating time of the call that has been placed. The signal on line 39 also is applied to the set terminal of the latch 46, which therefore produces on line 53 a "high" output signal which is applied to one of the inputs of gate G4. At this time the other input to gate G4 (line 54) is low so that the output of this gate remains high so that a signal remains on line 55 and holds switch SW3 in its "ON" state.

When switch SW1 is turned off, the capacitor C4 is charged through both of the resistors R15 and R16. This prepares the circuit for "time out" of its charged condition, when the called party subsequently disconnects or goes on-hook. Until this occurs the high or "1" signal remains on line 39 to energize the associated data processing equipment.

When the called party goes on-hook, the reversed battery supervision is removed from the tip and ring lines T and R, so that the LED 15 ceases to glow. The associated transitor circuit also ceases to conduct and capacitor C4 begins to discharhge (switch SW1 now off) through the resistor R16, the diode D12 and the resistor R17 to ground. If the called party goes back off-hook again during this "time out" phase, the capacitor C4 starts to recharge and the "time out" is cancelled before the enabling signal to the input of gate G1 on line 37 is lost. However, if the called party stays on-hook for the complete "time out" period, as determined for example by the values of the resistors R16 and R17, then the signal on line 37 will eventually fall to a low or "zero" state, thereby causing the output of gate G1 to go high, once again switching switch SW1 to its "ON" mode and applying through the now-closed switch SW3 a signal which is applied through line 38 to the input of gate G2 so that the output of this gate goes low, thereby removing the signal from line 39 and the enabling signal from the associated data processing equipment. At this time, therefore, the metering equipment is shut off to indicate the termination of the outgoing telephone call from phone 30. At this time also the signal on line 38 is applied through line 54 to one of the inputs of gate G4, both of which are now in their high states, so that the output of this gate goes low, thereby removing the signal from line 55. This causes switch SW3 to turn off. At this time the pull-up resistor R25 holds the input to G2 at a high or "1" state so that the output of this gate remains low, thereby preventing reenablement of the associated data processing equipment. Thereafter any successive battery reversals during the same call (before loss of ground on the sleeve S) will not cause a "charge" condition because switch SW3 is off. This condition is reset by removal of the ground potential from the sleeve lead S.

Whenever the subscriber goes on-hook, the central office equipment is released, and ground potential is removed from the sleeve S. This causes capacitor C5 to begin discharging through diode D13 and resistor R23 to ground. After a nominal 56 miliseconds, which provides a validation of the loss of ground on the sleeve lead S, the inputs to gate G3 go low so that its output goes high so that a signal is applied by line 47 to the switching terminal on switch SW2 once again to turn this switch to its "ON" condition, so that it inhibits gate G1 so that the output of this gate is high. The output of gate G3 also at this time is applied through line 45 to the reset terminal on the latch 46 so that this latch is reset, thus removing the signal from line 53 so that gate G4 is inhibited causing its output to go high. This produces a signal on line 55 which resets switch SW3 to its ON mode so that the signal at the output of gate G1 is applied to the input of gate G2 to maintain the output of this gate low until the next outgoing local telephone call is made by the phone circuit.

From the foregoing it will be apparent that the instant invention provides relatively simple and compact means for metering local outgoing calls from telephones, and for preventing undesirable interruption of the metering equipment as a result of stray signals in the associated circuits, or unintentional, momentary interruption of an outgoing call, such as for example, as might occur when the called party accidentally, or momentarily goes on-hook during a conversation. The herein described circuits obviate the need to emply electrico-mechanical devices for switching metering equipment between its on and off modes in response to outgoing local telephone calls; and, moreover, such circuits have the added advantage that they can be isolated, during use, from the pulse generating portions of the telephone circuit so that accidental voltage changes on the tip and ring lines will not accidentally interfere with the operation of the sensing circuits. Furthermore, by using two optical isolators of the type denoted at 16 and 22 or 42, it is possible to latch the sensing circuit in an "ON" condition once it has been energized in response to an outgoing local call, so that it will remain in operation despite any momentary battery reversals which might occur accidentally during the call. Furthermore, with circuits of the type disclosed herein it is possible to generate either a momentary signal to indicate the occurance of a single outgoing local telephone call, or alternatively, it is possible to use the circuit which will provide a steady state signal during the entire interval of time the outgoing local call is taking place.

While only two of the embodiments of the invention have been illustrated and described in detail herein, it will be apparent that this application is intended to cover any such modifications thereof as may fall within the scope of one skilled in the art or the appended claims.

Having thus described my invention what I claim is:

1. In combination with a telephone having tip and ring lines the polarities of which are reversed upon each successful placement of an outgoing call, message metering interface apparatus, comprising means connected in circuit with said lines for detecting when an outgoing call from the telephone has been successfully completed, said detecting means including means generating a first signal when the current flow in one of said lines flows in a predetermined direction, second signal generating means including signal sensing means optically coupled to said first signal generating means and operative upon sensing said first signal to generate a second signal, and means responsive to the generation of said second signal to generate a third signal for actuating a message metering device associated with the telephone.

2. The combination as defined in claim 1, wherein said third signal generating means includes means for producing a signal for momentarily actuating said metering device once each time an outgoing call is successfully placed on said lines.

3. The combination as defined in claim 1, wherein said third signal generating means includes means for producing a steady signal for continuously operating said metering device for the duration of each successfully placed outgoing call.

4. The combination as defined in claim 1, including a third line associated with said telephone for signalling the placement of a call, and means connected to said third line for sustaining one of said second and third signals, respectively, for the duration of each successfully placed outgoing call.

5. The combination as defined in claim 4, wherein said first signal generating means includes a first light emitting diode connected in one of said tip and ring lines, respectively, to conduct when the polarities of said lines are in said other mode, and said signal sensing means comprises a first photo transistor responsive to illumination from said first diode to conduct and generate said second signal.

6. The combination as defined in claim 5, wherein said signal sustaining means comprises a second light emitting diode operatively connected to said third line to be energized thereby during each of said successful calls, a second photo-transistor responsive to illumination from said second diode to be rendered conductive thereby during each of said successful calls, and means connecting said second transistor to one of said second and third signal generating means, respectively, thereby to energize said one means for the duration of each of said calls.

7. The combination as defined in claim 6, wherein said connecting means comprises means connecting said second diode with said third line through the emitter-collector circuit of said first photo-transistor, and said second photo-transistor in the base-collector circuit of the first photo-transistor to maintain said first transistor conductive for each duration of each of said calls, and means interposed between said second diode and said third signal generating means momentarily to energize the latter once each time said first transistor is switched to its conductive mode.

8. The combination as defined in claim 6, wherein said second diode is energized by said third line during each of said successful calls, and independently of said first diode, and said connecting means includes latching means operative in response to the generation of said second signal simultaneously with the conduction of said second transistor to actuate and hold energized said third signal generating means for the duration of each of said calls.

9. The combination as defined in claim 8 including means operative upon termination of a call momentarily to hold said latching means actuated so that said third signal remains for a predetermined period after said tip and ring line polarities have returned to said one mode.

10. Apparatus for metering outgoing calls from a telephone of the type having tip and ring lines forming a loop in which current flow is reversed upon successful completion of an outgoing call, comprising means for generating a first signal when said telephone is used to place an outgoing call, means for sensing the reversal of current flow in said loop from one direction to another upon the successful completion of an outgoing call, second signal generating means responsive to said first signal generating means and to the flow of said current in said other direction to generate a second signal when said reversal of current flow in said loop occurs while said first signal is present, means responsive to said second signal to generate a third signal to operate a message metering device for recording the successful placement of each of said outgoing calls, and means for holding one of said second and third signal generating means energized for the duration of a call each time an outgoing call is successfully placed from said telephone.

11. Apparatus
for metering outgoing calls from a telephone of the type having tip and ring lines forming a loop in which current flow is reversed upon successful completion of an outgoing call, comprising means for generating a first signal when said telephone is used to place an outgoing call, means for sensing the reversal of current flow in said loop upon the successful completion of an outgoing call, second signal generating means responsive to said first signal generating means and to said sensing means to generate a second signal when said reversal of current flow in said loop occurs while said first signal is present, means responsive to said second signal to generate a third signal to operate a message metering device for recording the successful placement of each of said outgoing calls, and means for holding one of said second and third signal generating means energized for the duration of a call each time an outgoing call is successfully placed from said telephone, said second signal generating means including time delay means for preventing operation of said second signal generating means for a brief interval after said reversal of current flow in said loop.

12. Apparatus as defined in claim 10, wherein said means for sensing current flow in said loop comprises a light emitting diode connected in one of said lines and disposed to be illuminated by current flowing in the reverse direction in said loop, and said second signal generating means includes a photo transistor responsive to illumination from said diode to generate said second signal.

13. Apparatus as defined in claim 12, wherein said holding means comprises means connecting said phototransistor to said first signal generating means to be held thereby in its conductive mode for the duration of a call, each time said photo-transistor is switched to its conductive mode by said diode.

14. Apparatus for metering outgoing calls from a telephone of the type having tip and ring lines forming a loop in which current flow is reversed upon successful completion of an outgoing call, comprising means for generating a first signal when said telephone is used to place an outgoing call, means for sensing the reversal of current flow in said loop upon the successful completion of an outgoing call, second signal generating means responsive to said first signal generating means and to said sensing means to generate a second signal when said reversal of current flow in said loop occurs while said first signal is present, means responsive to said second signal to generate a third signal to operate a message metering device for recording the successful placement of each of said outgoing calls, and means for holding one of said second and third signal generating means energized for the duration of a call each time an outgoing call is successfully placed from said telephone, said means for sensing current flow in said loop comprising a light emitting diode connected in one of said lines and disposed to be illuminated by current flowing in the reverse direction in said loop, said second signal generating means including a photo transistor responsive to illumination from said diode to generate said second signal, said holding means comprising a gate responsive to said first and second signals to latch said third signal generating means in its operative mode during a successful call thereby to apply a continuous signal to said message metering device for the duration of said call, and time delay means for holding said second signal generating means energized during brief interruptions of current flow through said diode during each of said calls, thereby to prevent interruption of said third signal until the current flow through said diode ceases for a predetermined interval.

* * * * *